United States Patent [19]

Shiomi et al.

[11] 4,397,013

[45] Aug. 2, 1983

[54] CANTILEVER AND PHONOGRAPH PICKUP CARTRIDGE INCLUDING SAID CANTILEVER

[75] Inventors: Tadayoshi Shiomi, Ohmihachiman; Toshihiko Nishioka, Tokyo, both of Japan

[73] Assignees: Kyoto Ceramic Co., Ltd.; Nagaoka & Co., Ltd., both of Kyoto, Japan

[21] Appl. No.: 14,750

[22] Filed: Feb. 23, 1979

[30] Foreign Application Priority Data

Feb. 25, 1978 [JP] Japan ................................ 53/21099

[51] Int. Cl.$^3$ ........................ G11B 3/02; H04R 11/12

[52] U.S. Cl. .................................................... 369/170

[58] Field of Search .................................. 274/37, 38; 179/100.41 K, 100.41 Z; 369/170, 173

[56] References Cited

U.S. PATENT DOCUMENTS

| | | | |
|---|---|---|---|
| 600,935 | 3/1898 | Skaife | 138/177 |
| 2,507,188 | 5/1950 | Weathers | 274/37 X |
| 2,583,289 | 1/1952 | Bauer | 274/38 |
| 2,625,401 | 1/1953 | Frederick | 274/38 |
| 3,001,031 | 9/1961 | Jacque | 274/23 R |
| 4,103,117 | 7/1978 | Morinaga | 179/100.41 K |
| 4,120,742 | 10/1978 | Segawa et al. | 274/38 X |

*Primary Examiner*—Harry N. Haroian

*Attorney, Agent, or Firm*—Spensley, Horn, Jubas & Lubitz

[57] ABSTRACT

A cantilever for use in supporting a stylus tip of a phonograph pickup is disclosed, which consists of a pipe of a ceramic material composed mainly of aluminum oxide. This cantilever is light weight and has a high Young's modulus. When this cantilever is attached to a phonograph pickup, reproduction loss can be remarkably reduced over all the reproduction frequency range and sounds can be reproduced having good response characteristics.

2 Claims, 10 Drawing Figures

Fig. 5A
Fig. 5B
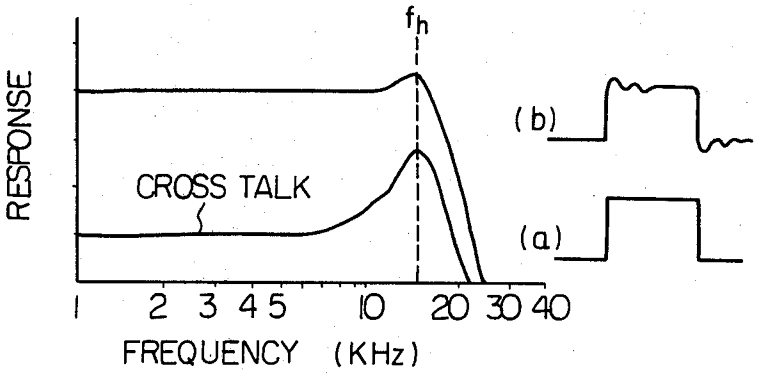
Fig. 6A
Fig. 6B
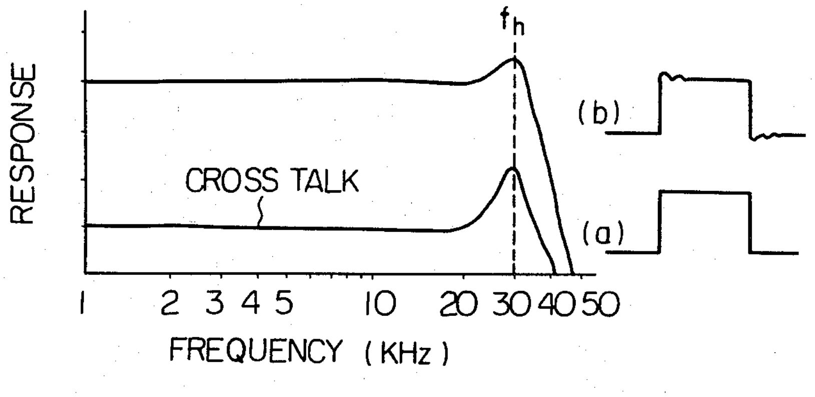

CANTILEVER AND PHONOGRAPH PICKUP CARTRIDGE INCLUDING SAID CANTILEVER

BACKGROUND OF THE INVENTION (1) Field of the Invention

The present invention relates to a cantilever for use in supporting a stylus tip of a phonograph pickup, and also to a phonograph pickup cartridge including this cantilever.

(2) Description of the Prior Art

Reproduction characteristics of a pickup cartridge depend mainly on the vibration system thereof, especially the physical properties of a cantilever or stylus arm. Accordingly, various improvements have heretofore been made in connection with the cantilevers. In order to attain uniform reproduction characteristics over all the reproduction frequency range, it is necessary to use a material having a high Young's modulus and a low specific gravity for formation of a cantilever. However, in reproduction of stereo-phonographic records, a cantilever inevitably undergoes torsional moment or bending moment. Thus, even if a material having a high Young's modulus is employed, the cantilever should also have a certain thickness. Accordingly, when a cantilever undergoes such moment during reproduction, a pickup cartridge is kept in such position, i.e., as if it were inclined toward a record, and as a result, distortion of sounds is increased and undesirable frequency characteristics inherent of reproduced sounds become prominent. This is a fatal defect to a pickup cartridge in which very true reproductin is required.

In conventional cantilevers, various improvements have been made so as to eliminate the foregoing defect. For example, materials composed of light metals such as aluminum subjected to various treatments, for example, the anodic oxidation surface treatment, and composite materials including carbon fibers, have been proposed. In these cantilevers, the apparent rigidity is considerably improved, but since a difficult technique is necessary for such special treatment, the productivity is low and the manufacturing cost is high. In case of composite materials, problems are involved in the properties of the respective materials to be combined, and thus troubles are created when these materials are combined to form composite materials. Accordingly, even when these materials are used for formation of cantilevers of pickup cartridges, no substantial effects can be attained.

BRIEF SUMMARY OF THE INVENTION

We found that when a pipe of a ceramic material composed mainly of aluminum oxide is used for formation of a cantilever of a phonograph pickup, there can be obtained very excellent sound reproduction characteristics.

In the present invention, sapphire, which is single crystal alumina, or a polycrystalline sintered body composed mainly of $\alpha$-alumina is preferably used as the ceramic material. The ceramic material composed mainly of aluminum oxide, which is used in the present invention, has some desirable characteristics which are not possessed by other materials at all. As will be apparent from the fact that this ceramic material has a specific gravity of 3.5 to 4.2, especially 3.6 to 4.1, the weight of the ceramic material is relatively light. Further, as will be apparent from the fact that the ceramic material has a Young's modulus of at least $2.0\times10^4$ Kg/mm$^2$, especially at least $2.5\times10^4$ Kg/mm$^2$, the ceramic material has no substantial ductility and is very close to a perfect rigid body. According to a preferred embodiment, the ceramic material has a flexural strength of at least 20 Kg/mm$^2$ and a Vickers hardness of at least 1000 Kg/mm$^2$, as measured under a load of 500 g.

In order to decrease the weight of the cantilever while maintaining the mechanical strength at a high level, in the present invention, it is important that the above-mentioned ceramic material should be used in the form of a pipe. It is preferred that the section of the pipe be circular, but the pipe may have any of other sectional shapes, for example, triangular, square, rectangular, trapezoidal and hexagonal shapes. For the reason set forth hereinafter, it is preferred that the outer diameter of the pipe be in the range of from 0.4 to 0.6 mm, and it also is preferred that the thickness of the pipe be in the range of from 0.05 to 0.15 mm.

In accordance with the present invention, there is further provided a phonograph pickup cartridge which comprises a cantilever vibrantly supported, said cantilever consisting of a pipe of a ceramic material composed mainly of aluminum oxide, a stylus tip fixed to vibrant one end portion of the cantilever, and a transducer mechanism for converting mechanic energy to electric energy, which is connected to said cantilever.

The present invention will now be described in detail.

BRIEF DESCRIPTION OF THE DRAWING

FIG. 5A is a curve illustrating frequency characteristics of a cartridge provided with a cantilever of a ceramic material having an outer diameter larger than 0.6 mm.

FIG. 5B is a curve illustrating the wave form of the rectangular input and the wave form of the output in the cartridge shown in FIG. 5A.

FIG. 6A is a curve illustrating frequency characteristics of a cartridge provided with a cantilever of a ceramic material having an outer diameter smaller than 0.4 mm.

FIG. 6B is a curve illustrating the wave form of the rectangular input and the wave form of the output in the cartridge shown in FIG. 6A.

DETAILED DESCRIPTION OF THE PREFERRED EMBODIMENTS

Figure 1:
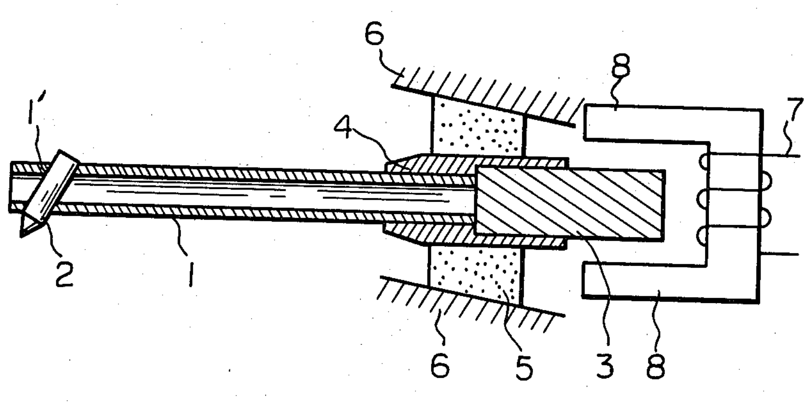
FIG. 1 is a sectional view illustrating the main part of a pickup cartridge provided with one embodiment of the cantilever of the present invention.

Referring to FIG. 1, a pipe-shaped cantilever 1 is composed of the above-mentioned ceramic material, and a stylus tip 2 for tracing grooves of a record is inserted in a hole 1′ formed at the top end portion of the cantilever 1 to pierce through the cantilever 1 in the vertical direction and the stylus tip 2 is bonded and attached to the cantilever 1 by an adhesive or the like. An armature 3 composed of a permanent magnet or a material having a high magnetic permeability is connected and fixed to the rear end portion of the cantilever 1 through, for example, a sleeve 4. The cantilever 1 is supported on a supporting portion 6 through a visco-elastic material 5 packed on the periphery of the sleeve 4, so that the top end portion of the cantilever 1 can vibrate. The armature 3 is located between a pair of yokes 8 of a coil 7 of a cartridge. Accordingly, the vibration of the stylus tip 2, namely the vibration of the armature 3, is converted to an electric signal by the coil 7. As the stylus tip 2, there can be used a known stylus, such as a diamond stylus or sapphire stylus. In addition to the above-mentioned moving magnet type electromagnetic mechanism, there may be used a known moving coil type electromagnetic mechanism or a known variable electrostatic capacity mechanism such as a cartridge condenser as the transducer mechanism for converting mechanical energy to electric energy.

Figure 2:
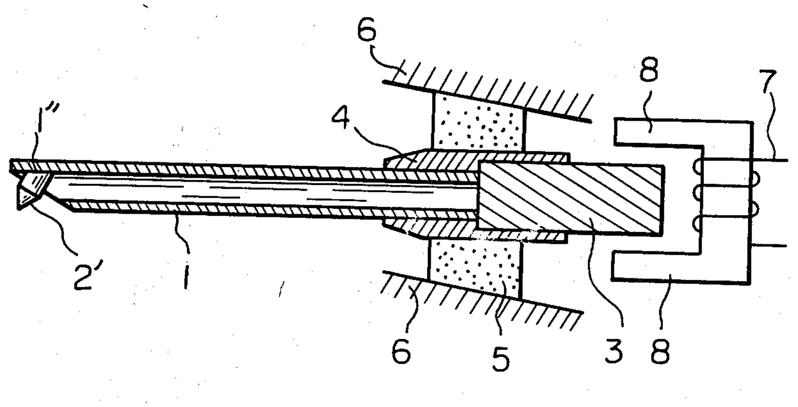
FIG. 2 is a sectional view illustrating the main part of a pickup cartridge provided with another embodiment of the cantilever of the present invention.

The stylus tip 2′ may be bonded and attached to an inner wall face 1″ formed by obliquely cutting the top end portion of the cantilever 1 as shown in FIG. 2.

Figure 3A:
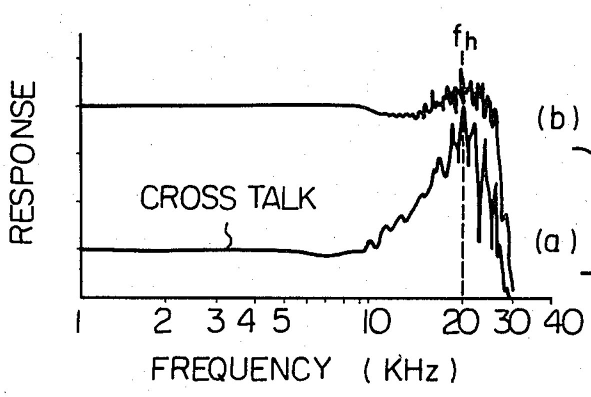
FIG. 3A is a curve illustrating frequency characteristics of a pickup cartridge provided with a conventional aluminum cantilever.
Figure 3B:
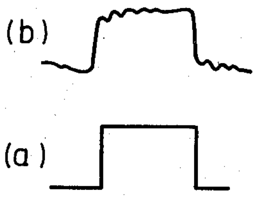
FIG. 3B is a curve illustrating the wave form of the rectangular input and the wave form of the output in the cartridge shown in FIG. 3A.
Figure 4A:
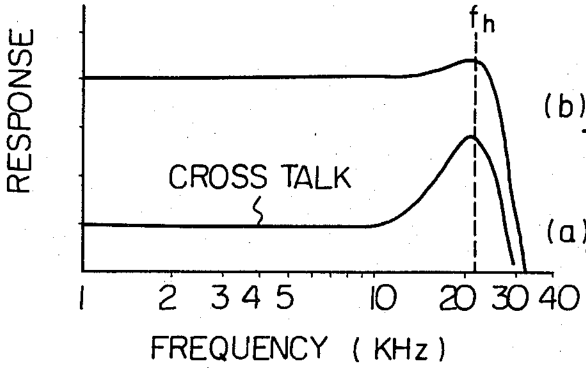
FIG. 4A is a curve illustrating frequency characteristics of a cartridge provided with a cantilever of a ceramic material according to the present invention.
Figure 4B:
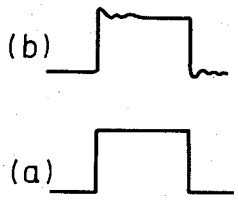
FIG. 4B is a curve illustrating the wave form of the rectangular input and the wave form of the output in the cartridge shown in FIG. 4A.

Advantages of the cantilever of the present invention will be apparent when FIGS. 4A and 4B are compared with FIGS. 3A and 3B. FIG. 3A is a curve illustrating frequency characteristics of a conventional aluminum cantilever having an outer diameter of 0.5 to 0.6 mm. As will be apparent from FIG. 3A, the resonant frequency fh of this conventional cantilever is 20 KHz. The variation responding to a frequency approximating to this resonant frequency is very violent and irregular tracing is conspicous, and bad influences are exerted on crosstalk characteristics and the crosstalk component is increased in the high frequency range. Further, as is seen from FIG. 3B, since aluminum has a bending property, the frequency response is extremely poor. More specifically, the response to a rectangular wave (a) of 1 KHz is considerably disturbed as is seen from the response wave form (b). Frequency characteristics and response characteristics of a pipe-shaped cantilever of a ceramic material having an outer diameter of 0.4 to 0.6 mm according to one embodiment of the present invention are shown in FIGS. 4A and 4B. As is seen from FIGS. 4A and 4B, the resonant frequency of this cantilever is slightly shifted to the high frequency side, and it shows very smooth and uniform frequency characteristics. Further, even in the high frequency range, crosstalk is not so prominent as in the conventional aluminum cantilever, and the response characteristics of this cantilever are very excellent as is apparent from the response wave form (b) shown in FIG. 4B.

Characteristics of pipe-shaped ceramic cantilevers having an outer diameter larger than 0.6 mm and an outer diameter smaller than 0.4 mm are shown in FIGS. 5A and 5B and FIGS. 6A and 6B, respectively. In case of the cantilever having an outer diameter larger than 0.6 mm, though the mechanical strength is high, as is apparent from FIG. 5A, the resonant frequency fh is as low as about 16 KHz, and therefore, the inherent vibration of the vibration system is reduced. Accordingly, this cantilever is not suitable for reproduction of sounds from a record. In case of the cantilever having an outer diameter smaller than 0.4 mm, the resonant frequency fh is about 30 KHz, and this cantilever has ideal frequency characteristics. However, the mechanical strength is too low and the cantilever is not applicable to a pickup cartridge any more. Accordingly, even if this cantilever has ideal frequency characteristics, since it has no practical strength, it cannot be used for reproduction of sounds from a record.

As will be apparent from the foregoing embodiments shown in FIGS. 4 to 6, in order to attain ideal sound characteristics and sufficient mechanical strength, it is preferred that the outer diameter of the pipe-shaped ceramic cantilever be 0.4 to 0.6 mm, and in this case, the thickness of the pipe is preferably in the range of from 0.05 to 0.15 mm.

As will be apparent from the foregoing illustration, the cantilever of the present invention consists of a ceramic pipe having a diameter in the above-mentioned range and being composed mainly of aluminum oxide. By virtue of this characteristic feature, various advantages can be attained. For example, the Young's modulus to the effective mass is very high and reproduction loss is remarkably reduced over the entire reproduction frequency range. Further, the response to a large amplitude is good, and a sharp rising of sound can be obtained. Moreover, a ceramic material composed mainly of aluminum oxide, such as sapphire, is distinguishable over a metallic material in the point that it has no ductility and is very close to a perfect rigid body. Further, the ceramic material is free of undesirable properties possessed by the conventional composite material. Still further, since this ceramic material is shaped in the form of a pipe, characteristics of aluminum oxide are effectively utilized, and the cantilever hardly undergoes torsion moment or bending moment, and therefore, the crosstalk component or distortion of sound can be remarkably reduced in the cantilever of the present invention. In addition, the method used to make the ceramic pipe is relatively straight forward and enables uniform characteristics to be achieved with substantial deviation. Preferably, the ceramic pipe is made by press molding ceramic powder and then sintering the same. Thus it is possible to achieve uniform characteristics and properties without any substantial deviation. Therefore, according to the present invention, cantilevers having excellent and stable characteristics can be manufactured at high efficiency. Moreover, a ceramic material composed mainly of aluminum oxide, such as sapphire, is very chemically stable, and hence, any surface treatment or the like need not be made on this material. Accordingly, the present invention provides cantilevers having various desirable characteristics which represents a significant contribution to the art.

What we claim is:

1. In a phonograph pickup cartridge having a vibrantly mounted cantilever, a stylus tip fixed to one end portion of the cantilever, and a transducer mechanism for converting mechanical energy to electric energy connected to the other end of said cantilever, the improvment wherein said cantilever consists of a hollow pipe made of a sintered body of ceramic material composed mainly of $\alpha$-$Al_2O_3$, said pipe having an outer diameter of 0.4 to 0.6 mm and a thickness of 0.05 to 0.15 mm and said ceramic material having a specific gravity of 3.5 to 4.2 and a Young's modulus of at least $2.0\times10^4$ $Kg/mm^2$.

2. A phonograph pickup cartridge as set forth in claim 1 wherein said ceramic material is composed of single crystal $\alpha$-$Al_2O_3$.

* * * * *